455-608 ... 233
10/26/82 ... 4,356,485

United States Patent [19]

Boschulte et al.

[11] 4,356,485

[45] Oct. 26, 1982

[54] DEVICE FOR THE SIGNAL-TECHNICAL SECURE CONTROL AND MONITORING OF ELECTRICAL LOADS

[75] Inventors: Rainer Boschulte; Heinrich Koehnecke; Siegfried Muecke, all of Braunschweig, Fed. Rep. of Germany

[73] Assignee: Siemens Aktiengesellschaft, Berlin & Munich, Fed. Rep. of Germany

[21] Appl. No.: 210,308

[22] Filed: Nov. 25, 1980

[30] Foreign Application Priority Data

Dec. 21, 1979 [DE] Fed. Rep. of Germany ....... 2951932

[51] Int. Cl.[3] ...................... H04Q 9/00; G08G 1/097; H04B 9/00

[52] U.S. Cl. ............................... 340/825.17; 455/608; 340/46; 340/825.3; 340/825.62; 340/825.37

[58] Field of Search ........... 340/41, 46, 164 R, 167 R, 340/168 S, 163; 455/603, 608, 612

[56] References Cited

U.S. PATENT DOCUMENTS

| | | | |
|---|---|---|---|
| 3,577,187 | 5/1971 | Benson | 340/163 |
| 3,597,684 | 8/1971 | Damen | 455/608 |
| 3,692,802 | 12/1971 | Clark et al. | 340/46 |
| 3,803,974 | 4/1974 | Everest et al. | 340/163 |
| 3,893,067 | 7/1975 | Watanabe et al. | 340/46 |
| 3,902,156 | 8/1975 | Hill | 340/41 R |
| 4,161,650 | 7/1979 | Caouette et al. | 455/612 |
| 4,161,651 | 7/1979 | Sano et al. | 455/603 |

*Primary Examiner*—Donald J. Yusko
*Attorney, Agent, or Firm*—Hill, Van Santen, Steadman, Chiara & Simpson

[57] ABSTRACT

In a remote control system which is operated by way of light wave guides a specific switching routine is executed at the receiving side upon failure of the system. As long as the remote control system functions properly, cyclically alternating signals, triggered at the transmission side, set a logic element at the receiving side so that the loads are connected for normal command-responsive operation. When the signals fail, or when a transmission is intentionally suppressed, the logic element is conditioned to cause execution of the specific switching routine. Given the design of the remote control system as a light signal control for traffic signals, the switching routine causes the connection of the STOP signal with simultaneous disconnection of the GO signals of the respectively affected light signal.

9 Claims, 1 Drawing Figure

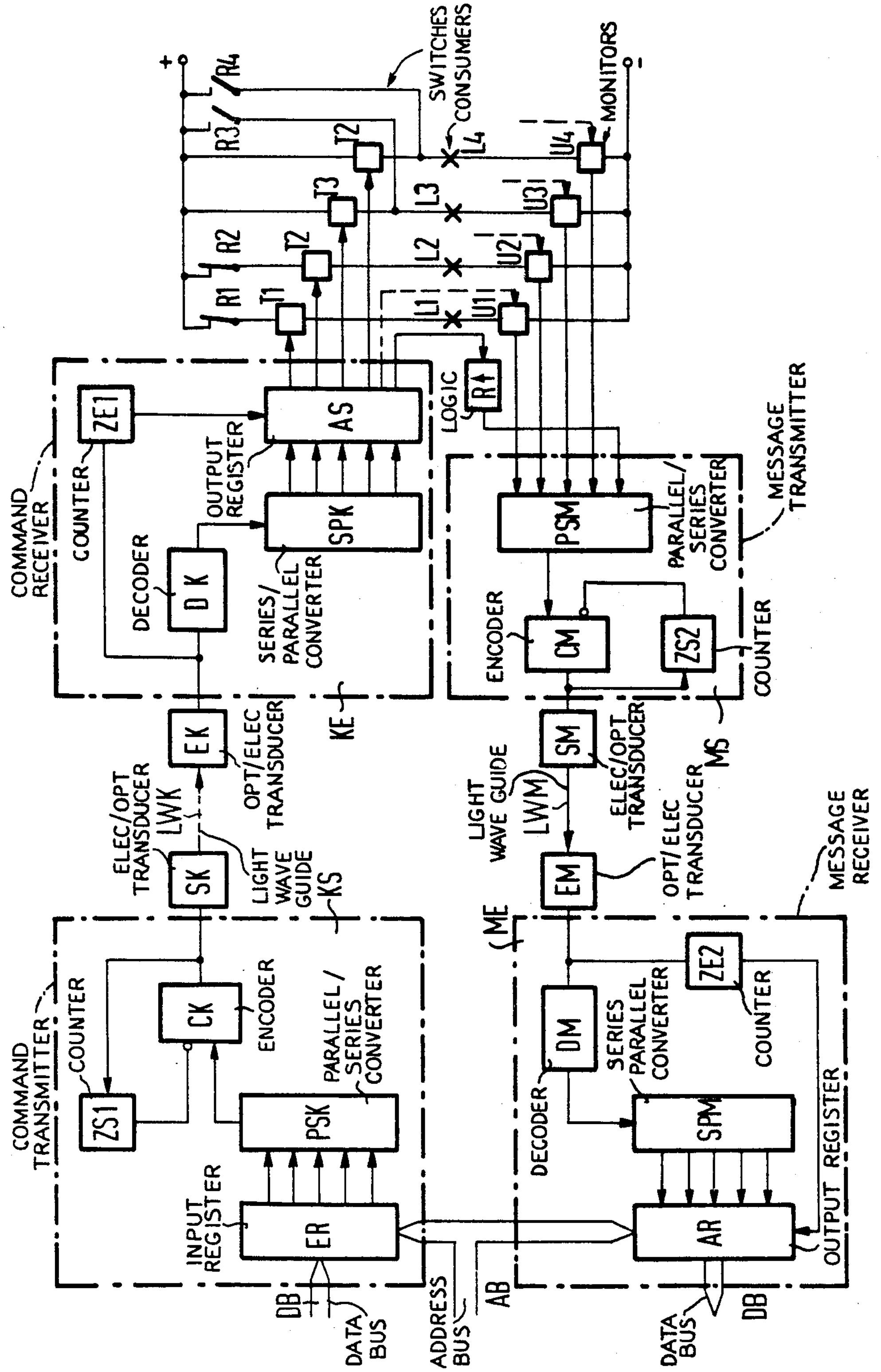
COMMAND TRANSMITTER
COUNTER
ZS1
CK
ENCODER
PSK
PARALLEL/SERIES CONVERTER
ER
INPUT REGISTER
DB
DATA BUS
ADDRESS BUS
AB
KS
SK
ELEC/OPT TRANSDUCER
LWK
LIGHT WAVE GUIDE
EK
OPT/ELEC TRANSDUCER
KE
COMMAND RECEIVER
COUNTER
ZE1
DECODER
DK
SERIES/PARALLEL CONVERTER
SPK
OUTPUT REGISTER
AS
LOGIC
R1
R2
R3
R4
T1
T2
T3
L1
L2
L3
L4
U1
U2
U3
U4
SWITCHES
CONSUMERS
MONITORS
MESSAGE TRANSMITTER
PSM
PARALLEL/SERIES CONVERTER
ENCODER
CM
ZS2
COUNTER
MS
SM
ELEC/OPT TRANSDUCER
LIGHT WAVE GUIDE
LWM
EM
OPT/ELEC TRANSDUCER
ME
MESSAGE RECEIVER
ZE2
COUNTER
DM
DECODER
SERIES PARALLEL CONVERTER
SPM
AR
OUTPUT REGISTER
DATA BUS
DB

DEVICE FOR THE SIGNAL-TECHNICAL SECURE CONTROL AND MONITORING OF ELECTRICAL LOADS

BACKGROUND OF THE INVENTION

1. Field of the Invention

The invention relates to a device for signal-technical secure control and monitoring of a plurality of electrical loads arranged in spatial proximity at individual operating locations extending from a control location, particularly for controlling and monitoring light signal systems for railroads which are fed across long distances, by employing preferably, electronic switching circuits for the comparison of status reports of the loads transmitted back from the loads to the central location, the comparison being with respect to commands initiated at the control location.

2. Description of the Prior Art

For monitoring electrical loads, it is known to measure the current consumption of the loads and to compare the consumed measured values with prescribed reference values. Thereby, the monitoring operation can proceed constantly by way of dedicated lines as is the case, for example, in monitoring light signal systems in railroads or it can be executed cyclically or sporadically in successive time intervals which permits a sufficiently small error discovery time to be achieved.

In order to identify errors which could occur in the measurement of the current consumption of the electrical loads, for example, due to shunts, and in order to identify transmission malfunctions which could arise, for example, due to the coupling-in of electrical signals in the transmission path between the loads and the control location and could simulate a specific operating state of the loads at the control location, it is known in the art to trigger specific reactions at the load side by brief inversions of the control command and to evaluate the brief status change of the monitoring reports. Such a system for controlling and monitoring electrical loads is described, for example, in the periodical "Electronics" of Aug. 30, 1979. A control and monitoring device for motor vehicles driven by a microprocessor is presented therein, in which the individual loads, preferably the light equipment of a vehicle, are monitored in that the loads respectively operationally connected are briefly disconnected and the respectively disconnected loads are briefly connected. Thereby, the time intervals for the brief reversals of the loads are selected in such a manner that, although the monitoring devices for identifying the respective load current can respond, the human eye cannot yet follow the connection or, respectively, disconnection of the loads in the reversal interval. The known control monitoring device makes an extremely rapid error recognition possible in the case of a malfunction, even though only a given limited plurality of loads are to be monitored. An alarm table at which each malfunction identified can be optically localized is provided for the alarm display. This optical localization is the starting point for a later elimination of the malfunction.

The danger of transmission errors, in particular, both in the command and in the alarm direction, becomes all the greater the further the loads to be controlled and to be monitored are distanced from a control location. These transmission errors can be avoided according to the present state of the art in that light wave guides are employed as the transmission medium between the control location and the electrical loads. Even though transmission disruptions due to the coupling-in of disturbances can be excluded with certainty given these light wave guides, one must nonetheless reckon with component failures in the connected transmission and reception modules. These component failures cannot be that easily determined given employment of electronic switching devices such as, for example, given employment of special relays with forced contacts whose switching state can simultaneously be multiply monitored in different circuits. Since component defects cannot, basically, be excluded, a fail-safe behavior of the circuits working with these components must be achieved—at least given such use areas in which undetected misinformation due to component defects could lead to personal or material endangerment i.e., unavoidable component defects, whether in the transmitting module or in the receiving module of a system, dare not lead to a dangerous operating state in the circuits connected thereto.

SUMMARY OF THE INVENTION

The object of the present invention is to provide a device as basically set forth above which is sufficiently secure in a signal-technical sense despite the employment of relatively unreliable circuit elements both in the control location and in the local operating locations.

The above object is achieved, according to the present invention, in a system of the type set forth above, which is particularly characterized in that the control locations cyclically transmits prepared commands to the individual operating locations of the loads by way of a remote control system, that a logic element, chargeable by reversely-transmitted messages which also change from transmission cycle to transmission cycle is provided at each operating location, the logic element connecting or, respectively, disconnecting the loads of the appertaining operating location according to a prescribed switching routine upon failure of the messages beyond the prescribed cycle time, and in that the logic element can be intentionally disconnected from the control location by suppressing the reverse messages upon identification of specific operational malfunctions, the disconnection of the logic element effecting an emergency-type operation of the loads, such as indicating a STOP function for traffic.

BRIEF DESCRIPTION OF THE DRAWING

Other objects, features and advantages of the invention, its organization, construction and operation will be best understood from the following detailed description, taken in conjunction with the accompanying drawing, on which there is a single block and schematic circuit diagram of a control and monitoring system constructed in accordance with the present invention.

DESCRIPTION OF THE PREFERRED EMBODIMENTS

Referring to the drawing, at the left, a command transmitter KS and a message receiver ME are illustrated for a control location. At the right, the drawing illustrates a command receiver KE and a message transmitter MS for a plurality of electrical loads arranged in spatial proximity at a specific operating location. The electrical loads are symbolized by signal lamps L1–L4, commonly referenced as consumers. The command transmitter KS and the message receiver ME of the control location are driven, for example, by a secure microcomputer (not illustrated in detail) at whose data and address buses DB and AB an input register ER is provided for commands and an output register AR is provided for messages.

The input register ER of the command transmitter KS is addressed by the address bus AB of the computer for command reception; thereby, it accepts the data from the data bus DB into the register ER. The register ER, for example, can have a width of 5 bytes according to 40 bits. After the inscription of the fifth byte into the input register ER, the conversion of the bits stored in the register into a serial telegraphic message is initiated. To this end, the data are read from the input register ER into a parallel/series transducer PSK for the commands and are supplied from the transducer to an encoder CK for encoding the commands. The pulse sequence supplied by the parallel/series transducer PSK is converted in the encoder CK into a form suitable for transmission. This occurs in that, for example, the encoder CK converts the bits read from the parallel/serial transducer PSK into a pulse sequence having a changing pulse-to-pause ratio depending on the respective binary state. A counter ZS1 is connected to the output of the encoder CK. By counting the pulses emitted by the encoder, the counter ZS1 is in a position to recognize the beginning and the end of a complete pulse telegraphic message for the command. It blocks the encoder after a complete command message has been output and thus guarantees that no further message can be output without a new input information.

The transmission of the commands from the command transmitter to the message receiver occurs by way of a light wave guide LWK. To this end, the pulse sequences emitted by the encoder CK with varying pulse-to-pause ratio are converted in a transmission module SK into brief light pulses having a corresponding pulse spacing and are fed into the light wave guide. The light pulses received via the light wave guide LWK are reconverted into electrical pulses and a receiving module EK at the operating location of the loads to be controlled and monitored, the pulse-to-pause ratio of the electrical pulses corresponding to the pulse-to-pause ratio of the pulses emitted by the encoder CK to the transducer SK. A post-connected decoder DK for the commands reconverts the supplied pulse sequence into the bit sequence taken from the parallel/series tranducer PSK with the appertaining binary state values "high" and "low" and supplies the same to a serial/parallel transducer SPK for the commands. As soon as the counter ZE1 assigned to the command receiver ME has reached a switch position corresponding to the plurality of transmitted bits, the counter ZE1 supplies a transfer pulse to an output register AS connected to the output of the series/parallel transducer SPK, the output register AS subsequently accepting the bit sequence stored in the series-parallel transducer SPK and offering the same for the execution of the command.

In the illustrated exemplary embodiment, we have proceeded from the fact that each bit of the bit sequence transmitted via the light wave guide LWK is assigned to a specific load of the operating location and that the respective binary signal state of the bit identifies the respective rated operating state of the appertaining load. For this reason, a plurality of switches T1-T4, which serve for the connection and disconnection of the loads L1-L4, are connected to the outputs of the output register AS. The respective switching state of the loads L1-L4 is identified by a respective plurality of monitors U1-U4, directly or indirectly connected to their current paths, and is forwarded to a message transmitter MS for the transmission of status reports. The monitors are advantageously designed as threshold switches which respond given an inadmissibly low load current and an inadmissibly high load current and transmit an appertaining status report for the appropriate load which differs from the status report transmitted given a proper load current.

In the message transmitter, the status reports of the monitors U1-U4 are supplied as bit configurations to a parallel/series converter PSM for the reports. The parallel/series converter emits a pulse sequence at its output to an encoder CM for the reports, the pulse sequence, given the proper operating state of all loads of the operating location, corresponding, with the exception of a few check bits and of a monitoring bit for the switching element, to the pulse sequence relayed from the parallel/series converter PSK of the command transmitter KS to the encoder CK. The encoder CM for the report messages is constructed in a similar manner to the encoder CK for the commands. It converts the pulse sequence supplied thereto from the parallel/series converter PSM into a pulse sequence having a pulse-to-pause ratio which corresponds to the binary signal state of the bit configuration received from the parallel/series converter. A counter ZS2 connected to the output of the encoder CM responds as soon as the encoder CM has relayed a complete message to a transducer, an electric/optical transducer SM, connected to the output thereof and then blocks the input of further signals by applying a blocking potential until the renewed receipt of commands by the command receiver. The switching structure of the synchronization of the command reception and the message transmission are not illustrated in further detail on the drawing because they have nothing to do with that which is essential to the invention. The synchronization occurs by regaining the constant pulsing frequency selected at the transmission side for the parallel/series converter PSK from the clock pulse sequence of the commands received via the light wave guide LWK with a varying pulse-to-pause ratio.

The pulse sequence supplied to the encoder CM of the message transmitter is converted in a electro/optical transducer SM into brief light pulses with corresponding pulse spacing and is transmitted via a light wave guide LWM for the status reports to the message receiver ME of the control location. An opto/electric transducer EM is connected thereat to the light wave guide LWM, the transducer EM converting, analogously to the transducer EK of the command receiver, the received light pulses into electrical pulses having differing pulse spacing. A decoder DM connected to the output of the transducer EM converts the electrical pulses into corresponding binary signals having the states "high" and "low". The bit configuration emitted from the decoder DM arrives at a series/parallel converter SPM for the messages and is intermediately stored. A counter ZE2 connected to the output of the transducer EM counts the arriving pulses, responds after reception of the complete message and emits an acceptance pulse for the output register AR, the output register AR subsequently accepting the bit sequence stored in the series/parallel converter SPM. The received data are fetched from the output register AR on the data bus DB, as needed.

The proper execution of the command can be identified by comparing the data stored in the output register AR with the commands transmitted. To this end, the transmitted commands are to be stored in intermediate memories (not illustrated) until the corresponding message signals are returned.

The transmission path from the control location to the loads and back and the operational behavior of the loads can be monitored by triggering brief control commands for an individual or for all loads of an operating location. In order to achieve the required security in the control and monitoring of the loads, however, it is not necessary to identify any disruptions or any malfunctions of the loads but, rather, the possibility must exist that the loads of the individual operating locations be intentionally influenced from the control location precisely in the case of a malfunction. This can occur, for example, by the shut-down of a few, or of all, loads at the individual operating locations.

In order to be able to address the loads of the individual operating locations even in the case of a malfunction, and precisely in the case of a malfunction, a logic circuit R chargeable by specific control commands of the control location, is provided at each operating location, the logic circuit R becoming effective given failure with respect to the control commands after a prescribed time interval. According to a prescribed switching routine, it then switches off, in a permanent manner, those loads of the appertaining operating location whose current-conducting state could represent a danger. Additionally, the logic circuit connects a load whose current-conducting state signals a dangerous situation and which thus leads to the relief of the dangerous situation at the operating location.

According to the invention, it is provided that the control commands for charging the logic circuit are formed by cyclically changing reversely-transmitted commands or messages. The time between two successive control commands is determined by the admissible error disclosure time which, in turn, determines the temporal spacing for the treatment of the loads of an operating location by the secure microcomputer of the control location. If, for example, the reversely-transmitted messages fail due to a transmission malfunction, or if they are intentionally suppressed from the control location, then the logic circuit influences the loads of the affected operating location according to the predetermined switching routine. The respective switching state of the logic circuit can be perceived by corresponding status reports at the control location, the control location triggering a malfunction signal given failure of changing status reports in the successive transmission cycle.

In FIG. 1, the logic circuit R is symbolically indicated as a relay circuit and the switching structure controlled thereby is symbolically indicated as a plurality of relay contacts R1–R4. The disposition is selected in such a manner that the switching contacts assume the illustrated switch positions as long as reversely-transmitted signals (messages) for the logic element are received from transmission cycle to transmission cycle. Given failure of these messages with respect to the appertaining control commands, the switching contacts R1–R4 change positions. Thereby, the loads L1 and L2 are shut off due to the opening of the switching contacts R1 and R2, while at the same time the loads L3 and L4 are connected to voltage via the contacts R3 and R4, in particular, independently of whether the switches T3 and T4 are closed or not. The logic circuit can also be designed in a technology other than relay technology; accordingly, other appropriate switching devices are then employed instead of the illustrated switching contacts.

In the exemplary embodiment illustrated, the loads are designed as signal lamps of a light signal. The lamps L3 and L4 are to be assigned to the STOP symbol of the signal, while the lamps L1 and L2 represent a plurality of signal lamps for displaying GO symbols.

Given a random malfunction which must be evaluated by the control location as being suspect, the activation of the logic circuit situated at the malfunctioning loads and, therefore, the reversely-transmitted messages of the switching means controlled thereby can be introduced by the intentional suppression of the reversal-commands for the logic element. If, therefore, for example, a GO signal symbol is improperly displayed for any reason whatsoever at a light signal, although this should not be the case, then this condition is identifiable in the control location by comparing the command which to the reversely-transmitted messages, which then no longer correspond to one another. Due to the secure access to the logic circuit, the erroneously-connected signal symbol is switched off and the STOP symbol, signaling a danger condition, is switched on. This operation also sequences when the transmission path via the light wave guide, or of one or more of the elements of the command transmitter or of the command receiver, are defective. As soon as the messages for the logic element fail over a longer time, that is over the transmission cycle, the loads arranged at the appertaining operating location are driven into a switching state according to the measure of an emergency or malfunction program previously determined for the appertaining operating location, the switching state excluding a personal or material endangerment due to erroneously-transmitted or evaluated signals.

For a performance check of the remote control system and of the electrical loads at the individual operating locations, it is now possible in a known manner, to emit brief check commands from the control location which reverse the loads at the respectively-connected operating location. Thereby, it is possible to simultaneously briefly disconnect all connected loads and evaluate the corresponding replies at the control location. Usually, however, it is not possible to briefly connect all previously disconnected loads in common, because this would lead to inadmissible intrusions of the supply voltages. One must particularly reckon with this danger given the connection of signal lamps, because the same draw a cold current at the moment they are connected, which current lies far above the nominal current. For this reason, the check operation will be subdivided into a plurality of chronologically-successive sections for respectively only a few of the loads. If the check program is subdivided in such a manner that only the secondary filament of a signal lamp is first briefly connected in a first check phase and, in a further check phase, the primary and secondary filaments of a signal lamp are briefly connected in common, then, due to the reversely-transmitted status reports, not only the proper operating state of the two lamp filaments can be determined, rather, a performance test of the lamp filament monitors for switching from the primary to the secondary filament can be initiated. In the second check phase, first, both filaments will draw current simultaneously and as soon as a filament monitor connected in the current path of the primary filament has responded, the monitor will again disconnect the secondary filament already connected in the first check phase, whereby the monitor connected in the current path of the secondary filament will emit a corresponding status report to the control location.

In practicing the present invention, it is not only a performance test of the loads but, rather, a performance test of the monitoring devices is provided. This performance test is not coupled to the check program described in greater detail above for testing the operational behavior of the loads. However, just like such a test program, it serves to increase the operational security of the remote control system.

For checking the operational behavior of the monitoring devices, the same are first driven into one, and then into another, switch position by appropriate commands, independently of the respective switching state they have assumed. The drive of the monitoring devices is indicated on the drawing by broken lines between the output register AS of the command receiver and the monitoring devices U1–U4. The proper, or, respectively, the improper operational behavior of the monitoring devices, including that of the logic circuit R, can be seen from the status reports of the monitoring devices transmitted to the control location during the test operation by comparison with the reference states of the monitoring devices respectively prescribed by the control location.

In the exemplary embodiment described above, it has been assumed by way of simplification that similar commands and reports are output by the two transmission devices given the proper operation of the remote control system. However, it is more advantageous to either invert the commands or the messages in the appertaining transmitter and in the appertaining receiver and to thus force a reply which differs from the appertaining command so that the comparison device reads information content of each in an opposite view so that opposite commands and messages are treated as being equal.

The exemplary embodiment illustrated relates to employment of the invention in a light signal system. Of course, the invention can also be advantageously employed in other remote control systems in which a secure access to the loads is required in case of disruption.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. Apparatus for remotely controlling and monitoring the operational states of a plurality of spatially-proximate loads, comprising:

a control station including a command transmitter operable to cyclically transmit predetermined commands representing desired operating states of the loads;

a command receiver for receiving the commands;

switching means connected between said command receiver and the loads and operable in response to the received commands to condition the loads into the desired operating states;

monitoring means connected to said loads and operable in response to the actual operating states thereof to produce a corresponding message;

a message transmitter for transmitting the messages to said control station;

a message receiver in said control station for receiving the command messages;

comparison means in said control station connected to said command transmitter and said message receiver and operable to produce an alarm signal in response to inequality of content between a command and its reply message after the prescribed cycle interval;

control means in said control station connected to said comparison means and to said command transmitter for causing said command transmitter to transmit logic control commands, said logic control commands being formed by cyclically changing reversely-transmitted commands indicating change-overs from one tranmission to another; and logic means connected to said command receiver and to the loads, normally conditioned to permit the cyclic predetermined operation of the loads and responsive to the logic control command to condition the loads into a special operating state in the event of the changing logic control commands not occurring over a predetermined cycle time, such non-occurrence being able to be produced by the control means too in response to predetermined disturbances in operation of the control and monitoring means.

2. The apparatus of claim 1, wherein specific ones of the loads have a current-conducting state corresponding to a danger situation and specific ones of the loads have a non-current-conducting state, and said logic means comprises:

means operated by said logic control command in the event of predetermined disturbances to disconnect the last mentioned specific ones and to connect the first mentioned specific ones of the loads in current-conducting states.

3. The apparatus of claim 1, wherein specific ones of the loads have a current-conducting state corresponding to a danger situation, and said logic means comprises:

means operated by said logic control command in the event of predetermined disturbances to connect only said specific ones of the loads in current-conducting states.

4. The apparatus of claim 1, wherein said command transmitter and said command receiver constitute a command channel, and said message transmitter and said message receiver constitute a message channel, and further comprising:

means in one of said channels for inverting and storing a transmitted command, said comparison means including means operable to equate opposite information of a command and a message as being equal.

5. The apparatus of claim 1, wherein:

said command transmitter and said message transmitter each comprise a respective electro/optic transducer;

first and second light wave guides are connected to respective electro/optic transducers; and said command receiver and said message receiver each comprise a respective opto/electric transducer connected to a respective light wave guide.

6. The apparatus of claim 5, wherein:

said command transmitter and said message transmitter comprise means for transmitting over said first and second light wave guides, respectively, on a time division multiplex basis with at least one bit per cycle assigned to a respective load.

7. The apparatus of claim 1, wherein:

said monitoring means comprises a plurality of monitor circuits each connected to monitor the current-conducting state of a respective load and each monitor circuit comprising threshold switch means operable in response to a predetermined proper current-conducting state to produce one output and in response to current-conducting states predetermined to be too high or too low to provide a different output.

8. The apparatus of claim 1, and further comprising:

first and second light wave guides respectively forming command and message channels; and wherein:

said command transmitter and said message transmitter each comprise an electro/optic transducer connected to said first and second light wave guides, respectively, an input register for receiving parallel input data corresponding to the command or message to be transmitted, a parallel/series converter connected to said input register for converting the input data into serial form, an encoder connected between said parallel/series converter and said transducer for encoding the serial data and driving said transducer to produce the respective command or message, said encoder including a blocking input, and a counter connected between the output and said blocking input and operable to count the number of bits output by said encoder and to block said encoder in response to a predetermined number of bits.

9. The apparatus of claim 8, wherein:

each of said command receiver and said message receiver comprises an opto/electric transducer connected to the respective light wave guide, a decoder connected to said opto/electric transducer for decoding the received command or message, respectively, a series/parallel converter connected to said decoder for converting the decoded serial information into parallel data, an output register connected to said series/parallel converter for storing the parallel data, said output register including a data transfer input, and a counter connected between said opto/electric transducer and said transfer input and operable to count received data and to produce a data transfer signal to input the data into said output register upon reaching a predetermined count.

* * * * *